Nov. 4, 1958 F. M. RADDIN 2,859,084

MOUNTING MEANS FOR MAGNETIC TRANSDUCING HEADS

Filed Feb. 4, 1955 2 Sheets-Sheet 1

INVENTOR
FRANKLIN M. RADDIN
BY William L. Glover
AGENT

Nov. 4, 1958 F. M. RADDIN 2,859,084
MOUNTING MEANS FOR MAGNETIC TRANSDUCING HEADS
Filed Feb. 4, 1955 2 Sheets-Sheet 2

INVENTOR
FRANKLIN M. RADDIN
BY William S Slover
AGENT

United States Patent Office 2,859,084

Patented Nov. 4, 1958

2,859,084

MOUNTING MEANS FOR MAGNETIC TRANSDUCING HEADS

Franklin M. Raddin, Morristown, N. J., assignor to Monroe Calculating Machine Company, Orange, N. J., a corporation of Delaware Application February 4, 1955, Serial No. 486,056

16 Claims. (Cl. 346—74)

This invention relates to magnetic recording and more particularly to adjustable mountings for magnetic transducing heads.

Magnetic recording systems comprising magnetic drums are widely used for data processing equipment. These drums generally comprise a rotating non-magnetic cylinder having a thin magnetizable coating on its periphery. Data is recorded in parallel peripheral channels of the drum in the form of magnetized spots by magnetic transducing heads located in such close proximity to the drum surface that leakage flux at gaps in the heads link therewith. The same heads may be utilized for reproducing recorded data, or other heads located in other angular positions relative to the drum may be utilized for this purpose. Frequently one or more channels of a drum are used as precession or delay tracks, a pair of transducing heads associated therewith being spaced apart angularly of the drum a distance designed to provide a predetermined timed delay between recording of data by one head and reproducing thereof by the other head.

In magnetic drum systems of the sort under discussion critical positional adjustment of the transducing heads radially and angularly of the drum is required for optimum results. For example, optimum recording results may dictate that the heads be spaced .001 inch + or — .0025 inch from the surface of the drum.

In order to increase the capacity of magnetic drums systems extremely narrow reproducing heads have been developed to effect a high degree of channel density, that is, to make use of a maximum number of channels per longitudinal inch of drum surface. Means also have been developed to mount a plurality of these narrow heads in compact assemblies in which the heads are adjustable in groups. Known mountings of this sort have proven unsatisfactory in that they do not provide for individual adjustment of each head both radially and angularly with respect to the drum and/or in that they do not permit of the facile removal and replacement of individual heads.

The principal object of the invention therefore is the provision of radially and angularly adjustable mounting means for magnetic transducing heads, particularly narrow, wafer-like heads, which permit individual adjustment and removal and replacement of the heads, and yet which allow a high degree of channel density.

Another object of the invention is to construct the adjustable mounting means in such manner that they are adaptable for use with magnetic drums of varying diameters.

According to the invention a magnetic transducing head for a magnetic drum or the like is mounted on a plate divided into head and body portions by deep notches in its side edges which form a narrow neck portion. A transverse slot is provided in the body portion adjacent the neck and the notches. Preferably the center section of the slot is compressed through deformation of the plate and is traversed by screw means which serve to vary the width thereof and thus to adjust the transducing head radially. An adapter block secured to the edge of the plate farthest from the drum is provided with a convexly arcuate outer face which is concentric with the surface of the drum. A clamping block having a mating, concavely arcuate face is also provided. The two blocks are drawn together by suitable bolts against a pair of rods which extend parallel with the axis of the drum and are spaced apart a short distance on an arc drawn about said axis.

Other objects and features of the invention will become apparent from the following description when read in the light of the drawings of which:

Figure 1:
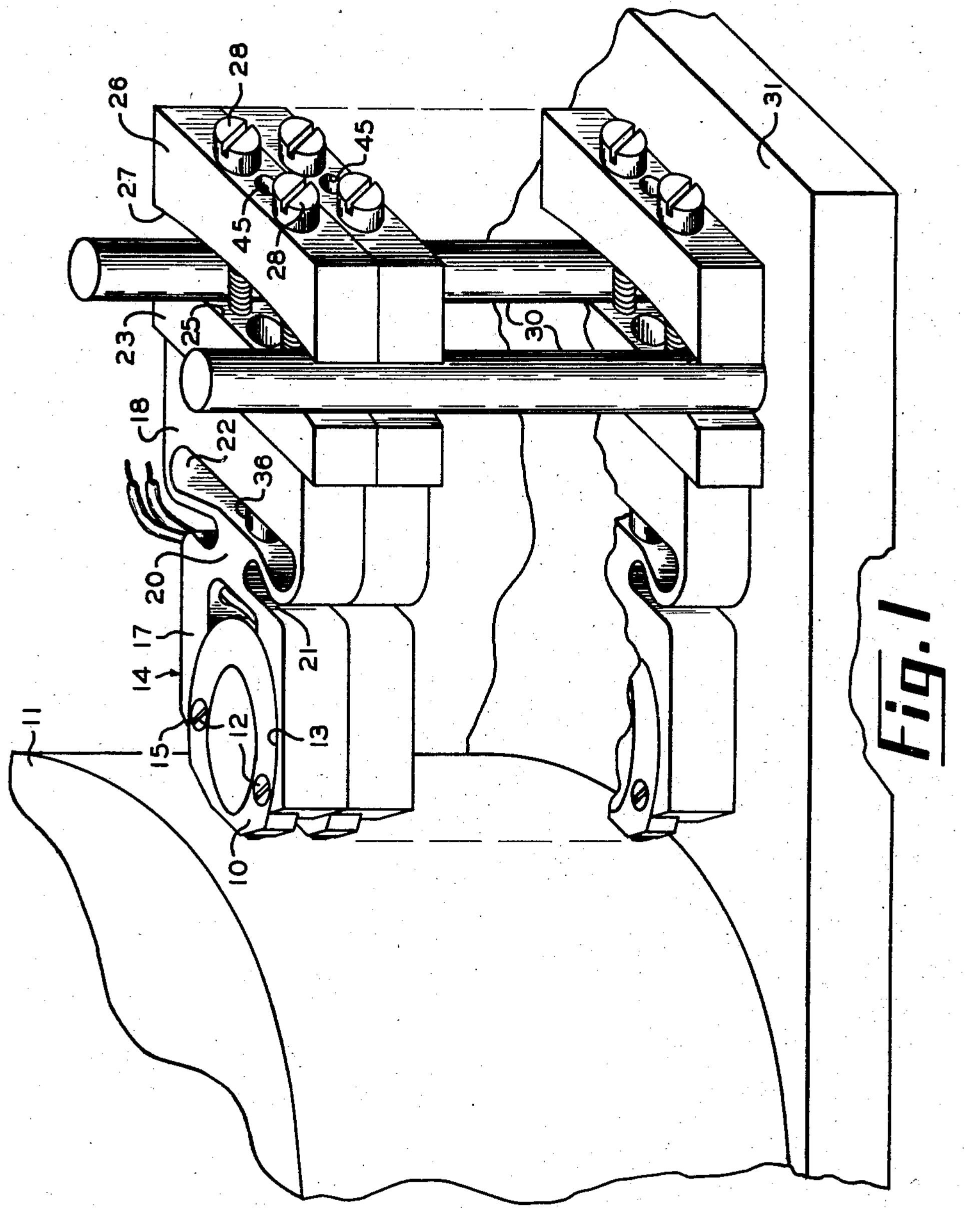
Fig. 1 is a fragmentary isometric view illustrating an assembly of a plurality of magnetic transducing heads supported in accordance with the invention.
Figure 3:
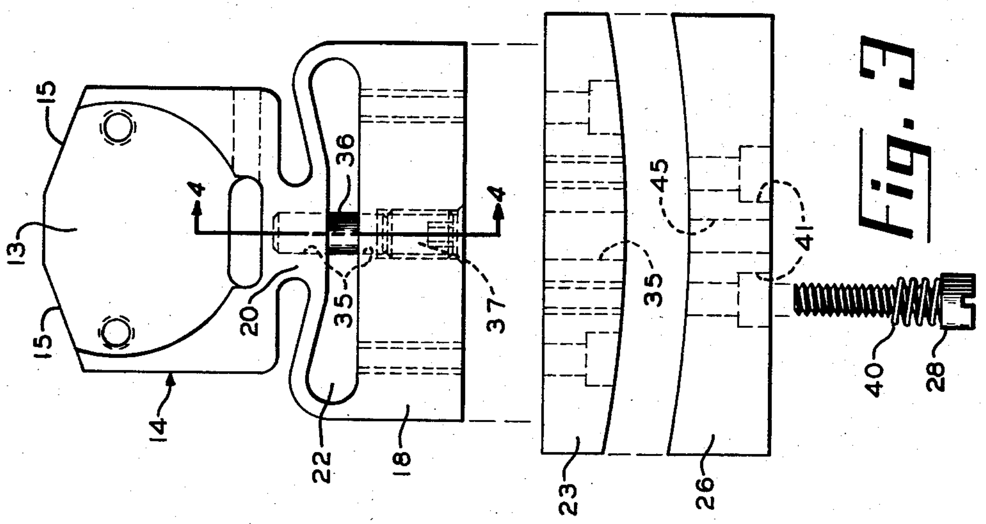
Fig. 3 is an exploded plan view of the mounting means of the invention with the transducing head removed therefrom; and, Fig. 4 is a fragmentary sectional view on line 4—4 of Fig. 3.

Referring to the drawings, the means of the invention are utilized to support a plurality of magnetic transducing heads 10 in operating positions relative to the surface of a magnetic drum 11. The heads 10 may be of any known variety, but preferably they are of the type disclosed in the copending application to L. Gerriert and F. Raddin, No. 462,733, Figs. 5–8. As shown, each head is in the form of a thin wafer which is secured by bolts 12 in a recess 13 fashioned in one face of a plate or block 14. Preferably the edge 15 of plate 14 adjacent drum 11 is convexly formed so that the side ends thereof are located a substantial distance from the drum when the gap 16 of the head 10 which is located centrally of said edge is positioned immediately adjacent the drum. The recess 13 in plate 14 is formed in what may be called the head portion 17 of the plate which is separated from the body portion 18 of the plate by a narrow, centrally located neck portion 20 formed by deep notches 21 cut in the side edges of the plate. As shown, the body portion 18 of the plate is somewhat wider than the head portion and is provided with a transverse slot 22 adjacent the neck portion 20 and the notches 21. The ends of the slot 22 are rounded as indicated, and, preferably the adjacent corners of the body portion 18 of the plate are rounded concentrically therewith. The walls separating the notches 21 from the slot 22 are of substantially uniform thickness throughout their longitudinal dimensions, which, because of the rounding of said corners extend around the latter approximately to the longitudinal center line of the slot. It has been found that when the walls are formed in this manner and the central portion of the slot is compressed by forcing the head and body portions of plate 14 toward one another to exceed the elastic limits of the walls, a greater range of variations in the thickness of the center portion of the slot can be attained without affecting a further deformation of the plate, than is obtainable with the other arrangements. Thus a maximum range of radial adjustment of a head 10 supported by the plate is available.

Preferably the plate 14 is constructed of a non-magnetic material such as aluminum and has an adapter block 23 of harder material, for example, steel, secured to the edge thereof opposite the edge 15 by bolts 24. The surface of block 23 furthest from the drum, that designated 25, forms an arc which, when the means are mounted in position relative to the drum, is concentric with the periphery of the drum. A clamping block 26 which may be of the same material as block 23 is also provided, being formed with a concavely arcuate surface 27 which is concentric with surface 25 when the two blocks are secured together by bolts 28.

In order to mount the means thus far described in position relative to the drum, a pair of rods or bars 30 are fixed in parallel relation to the axis of the drum, being spaced a short distance apart on an arc transcribed about said axis. As shown in the drawing by way of example, the rods 30 project from a base plate 31 in which the drum 11 is journalled.

Figure 2:
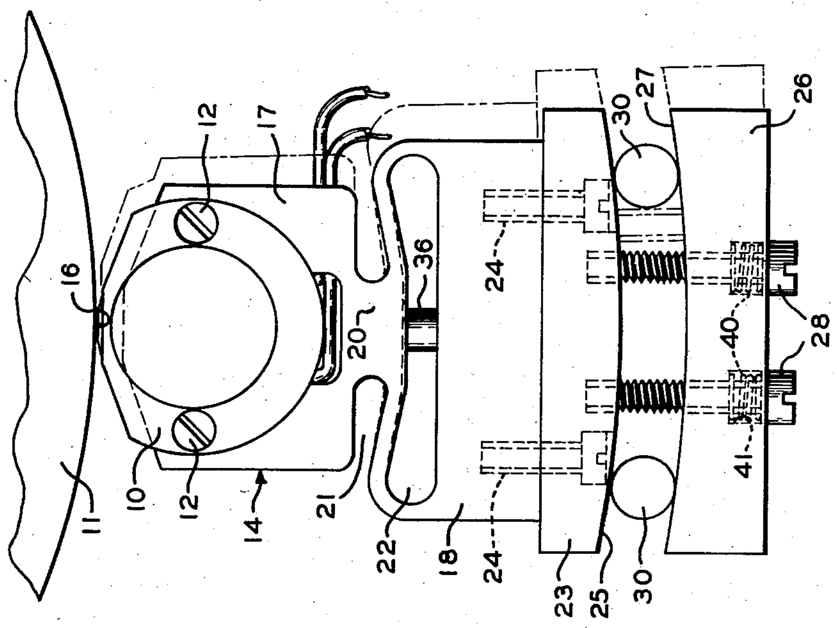
Fig. 2 is a plan view of the means of the invention.
Figure 4:
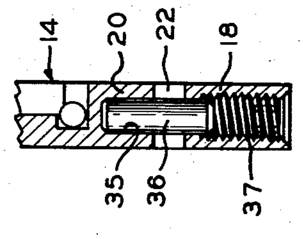

The construction is such that each head 10 is secured in position relative to the drum by clamping the blocks 23 and 26 associated with its mounting plate 14, on the rods 30, the bolts 28 being used for this purpose. Angular adjustment of the head is effected by sliding the blocks 23 and 26 transversely of the rods 30 as indicated in broken lines in Fig. 2. Preferably the rods 30 are spaced apart a distance designed to provide for maximum adjustment of the head supporting means, that is, a distance such that when one rod abuts one of the bolts 28, the other rod is located adjacent the farther ends of the blocks 23 and 26. Radial adjustment of the heads is obtained by varying the thickness of the compressed center portion of the slot 22. To this end aligned bores 35 are provided in the block 23 and in the body and neck portions 18 and 20 of plate 14. Mounted in the bore 35 in the neck portion 20 and preferably extending across the slot 22 into the bore in the body portion 18 of the plate is a bearing pin 36 engaged by a set screw 37 engaged in a threaded section of the bore 35 in the body portion. Preferably the set screw 37 is provided with an Allen head and the clamping block 26 is provided with a suitable opening 45 to permit access to the screw. Engagement of the pin 36 in the bores on either side of the slot serves to minimize angular displacement of a head as it is adjusted radially by rotation of screw 37. Preferably the screw 37 is normally in a mid-position in which the slot 22 is widened beyond its normal dimension to the extent of about half of the permissible range of adjustment. Thus, maximum amounts of adjustment of the head toward and away from the drum may be obtained.

Evidently, therefore, each of the plates 14 is adjustable individually and further, each is removable from the assembly independently of the others. Further, the means of the invention are readily adapted to drums of varying diameters by the inclusion of blocks 23 and 26 having corresponding appropriately curved mating surfaces and by locating the rods 30 correctly.

In order to maintain the arcuate surface 25 of block 23 against the rods 30 while the bolts 28 are in loosened condition, as for example, during angular adjustment of a plate 14, coiled springs 40 are wound on the bolts. Additionally, the holes in clamping block 26 through which the bolts 28 extend, are counterbored as at 41 to receive the springs 40 which are compressed between the bottoms of the counterbores and the heads of the bolts. The construction is such that when the bolts 28 are in loosened condition the springs 40 resiliently force the surface 25 of the block 23 against the rods 30.

It is to be mentioned that if desired the adapter block 23 may be eliminated and the adjacent surface of the plate 14 curved appropriately. However, when this construction is utilized care must be taken not to deform the said curved surface when the bolts 28 force the same against the rods 30. Also, if desired, the pin 36 may engage only in the bore 35 in the neck portion of plate 14.

While there has been above described a single embodiment of the invention it will be understood that many changes in and additions thereto may be made without departing from the spirit of the invention. It is not desired, therefore, to limit the scope of the invention except as pointed out in the appended claims or as dictated by the prior art.

I claim:

1. Means for adjustably supporting a magnetic transducing head relative to a magnetic recording medium comprising a plate divided by deep notches in the side edges thereof into a head portion adapted to support the transducing head and a body portion, the body portion being provided with a transverse slot adjacent the said notches and the plate being deformed to compress the slot intermediate the said notches, and means for altering the thickness of the compressed portion of the slot to move the head portion of the plate toward and away from the recording medium.

2. Means for adjustably supporting a magnetic transducing head relative to a magnetic recording medium comprising a plate divided by deep notches in the side edges thereof into a head portion adapted to support the transducing head and a body portion, the body portion being provided with a transverse slot adjacent the said notches, means for varying the thickness of the slot to move the head portion of the plate toward and way from the medium, a block secured to the body portion and having a face parallel with the surface of the recording medium, a second block having a face parallel with the first said face, a pair of rods extending between said faces, and means for clamping the blocks together against the rods.

3. Means for adjustably supporting a magnetic transducing head relative to a magnetic recording medium comprising a plate divided by deep notches in the side edges thereof into a head portion adapted to support the transducing head and a body portion, the body portion being provided with a transverse slot adjacent the said notches, means for varying the thickness of the slot to move the head portion of the plate toward and away from the medium, a block secured to the body portion and having a face parallel with the surface of the recording medium, a second block having a face parallel with the first said face, a pair of rods extending between said faces, and means for clamping the blocks together against the rods, the rods being spaced apart a distance which is less than the length of a said face to permit of the blocks being clamped on the rods in differential positions transversely of the rods.

4. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the said notches, and means for altering the thickness of the compressed portion of the slot to move the head portion of the plate radially of the drum.

5. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate said notches, means for varying the thickness of the compressed portion of the slot to move the head portion radially of the drum, a block secured to the body portion and having a face concentric with the periphery of the drum, a second block having a face concentric with the first said face, a pair of rods extending parallel with the axis of the drum and between said faces, and means for clamping the blocks together against the rods.

6. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the notches, means for varying the thickness of the compressed portion of the slot to move the head portion radially of the drum, a block secured to the body portion and having a face concentric with the periphery of the drum, a second block having a face concentric with the first said face, a pair of rods extending parallel with the axis of said drum and between said faces, and means for clamping the blocks together against the rods, the rods being spaced apart a distance which is less than the length of a said face to permit of the blocks being clamped on the rods in differential positions transversely of the rods.

7. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the said notches, and means for varying the thickness of the compressed portion of the slot to move the head portion of the plate radially of the drum, said means including a pin traversing the compressed portion of the slot, the plate being provided with aligned bores on either side of the slot in which the pin is engaged, and a screw mounted in the bore more distant from the head portion and acting against the end of the pin to move the head portion radially of the drum.

8. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the said notches, a block secured to the body portion and having a face concentric with the periphery of the drum, a second block having a face concentric with the first said face, a pair of rods extending parallel with the axis of the drum and between said faces, means for clamping the blocks together against the rods, a pin traversing the compressed portion of the slot, the plate being provided with aligned bores on either side of the slot in which said pin is engaged and a screw mounted in the bore more distant from the head portion and acting against the pin to move the head radially of the drum.

9. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the notches, a pin traversing the compressed portion of the slot, the plate being provided with aligned bores on either side of the slot in which said pin is engaged, a screw engaged in the bore more distant from the head portion and acting against the pin to move the head radially of the drum, a block secured to the body portion and having a face concentric with the periphery of the drum, a second block having a face concentric with the first said face, a pair of rods extending parallel with the axis of the drum and between said faces, and means for clamping the blocks together with the rods therebetween the rods being spaced apart a distance which is less than the length of a said face to permit of the blocks being clamped on the rods in differential angular positions relative to the drum.

10. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the notches, a pin traversing the compressed portion of the slot, the plate being provided with aligned bores on either side of the slot in which said pin is engaged, a screw engaged in the bore more distant from the head portion and acting against the pin to move the head radially of the drum, a block secured to the body portion and having a face concentric with the periphery of the drum, a second block having a face concentric with the first said face, a pair of rods extending parallel with the axis of the drum and between said faces, means for clamping the blocks together with the rods therebetween the rods being spaced apart a distance which is less than the length of a said face to permit of the blocks being clamped on the rods in differential angular positions relative to the drum, said means being loosenable to permit angular adjustments of the plate, and resilient means for maintaining the concentric face of the first mentioned block in contact with the rods on loosening of the clamping means.

11. Means for adjustably supporting a magnetic transducing head relative to a magnetic drum comprising a plate divided by deep notches in the side edges thereof into a head portion adapted to support the transducing head and a body portion, the body portion being provided with a transverse slot adjacent the said notches and the plate being deformed to compress the slot intermediate the notches, a pin traversing the compressed portion of the slot, the plate being provided with aligned bores on either side of the slot in which said pin is engaged, a screw engaged in the bore more distant from the head portion and acting against the pin to move the head radially of the drum, a block secured to the body portion and having a face concentric with the periphery of the drum, a second block having a face concentric with the first said face, a pair of rods extending parallel with the axis of the drum and between said faces, means for clamping the blocks together with the rods therebetween the rods being spaced apart a distance which is less than the length of a said face to permit of the blocks being clamped on the rods in differential angular positions relative to the drum, said means comprising a pair of headed bolts passing through the second block and threaded into the first, and resilient means for maintaining the concentric face of the first block in contact with the rods on loosening of said bolts comprising a coiled spring wound on each said bolt and acting between the head of the bolt and the second block.

12. Means for adjustably supporting a magnetic transducing head relative to a magnetic drum comprising a plate divided by deep notches in the side edges thereof into a head portion having a recess in one face to receive the transducing head and a body portion, the body portion being provided with a transverse slot adjacent the said notches and the plate being deformed to compress the slot intermediate the notches, a pin traversing the compressed portion of the slot, the plate being provided with aligned bores on either side of the slot in which said pin is engaged, a screw engaged in the bore more distant from the head portion and acting against the pin to move the head radially of the drum, a block secured to the body portion and having a face concentric with the periphery of the drum, a second block having a face concentric with the first said face, a pair of rods extending parallel with the axis of the drum and between said faces, means for clamping the blocks together with the rods therebetween the rods being spaced apart a distance which is less than the length of a said face to permit of the blocks being clamped on the rods in differential angular positions relative to the drum, said means comprising a pair of headed bolts passing through the second block and threaded into the first, and resilient means for maintaining the concentric face of the first block in contact with the rods on loosening of said bolts comprising a coiled spring wound on each said bolt and acting between the head of the bolt and the second block.

13. Means for supporting a magnetic transducing head relative to a magnetic drum comprising a pair of rods extending parallel with the axis of the drum, first and second blocks having mating arcuate surfaces engaging said rods and extending concentrically of the drum, means for clamping the blocks together against the rods, the rods being spaced apart a distance which is shorter than the length of a said face to permit of the blocks being clamped against the rods in differential angular positions relative to the drum, and a head supporting plate secured to the first block and extending toward the drum.

14. The combination according to claim 13 wherein the clamping means are loosenable to permit angular adjustment and including resilient means to maintain the first block in contact with the rods on loosening of the clamping means.

15. The combination according to claim 14 wherein the clamping means comprises a pair of headed bolts passing through the second block and threaded into the first block and the resilient means comprises a coiled spring wound on each said bolt and acting between the head of the latter and the second block.

16. Means for supporting a magnetic transducing head relative to a magnetic drum comprising a pair of rods extending parallel with the axis of the drum, first and second blocks having mating arcuate surfaces engaging said rods and extending concentrically of the drum, means for clamping the blocks together against the rods, the rods being spaced apart a distance which is shorter than the length of a said face to permit of the blocks being clamped against the rods in differential angular positions relative to the drum, and a head supporting member of adjustable length secured to the first block and extending lengthwise toward the drum.

References Cited in the file of this patent

UNITED STATES PATENTS

| | | |
|---|---|---|
| 2,015,412 | Rose | Sept. 24, 1935 |
| 2,553,699 | Brodin | May 22, 1951 |
| 2,769,037 | Dank | Oct. 30, 1956 |

FOREIGN PATENTS

| | | |
|---|---|---|
| 695,150 | Great Britain | Aug. 5, 1953 |